INVENTORS
EDWIN O. KLEMM
GEORGE K. MULHOLLAND
BY

*Learman, Learman & McCulloch*

ATTORNEYS

United States Patent Office 3,311,387
Patented Mar. 28, 1967

3,311,387
STEERING APPARATUS FOR TOWABLE VEHICLES
Edwin O. Klemm and George Keith Mulholland, Saginaw, Mich., assignors to Saginaw Products Corporation, Saginaw, Mich., a corporation of Michigan
Filed Feb. 25, 1965, Ser. No. 435,183
13 Claims. (Cl. 280—103)

This invention relates to towable vehicles having steerable wheels and more particularly to improved steering control apparatus which limits the steering movement to be imparted to the wheels, and wherein a towbar or the like is capable of substantially greater swinging movements than are the steerable wheels of the vehicle.

A towable trailer conventionally includes a towbar or the like which may be connected to a towing vehicle, the towbar also being connected to steering apparatus which is operable to impart steering or swiveling movements to a trailer's steerable wheels. Sometimes the towing vehicle must make an exceptionally sharp turn beyond the steering capability of the wheels and it is not uncommon in such instances for the steering mechanism of the towed vehicle to be subjected to such strain that the steering mechanism is damaged or broken. Also, when the towing vehicle is required to move rearwardly, the coupling between the towed vehicle and the towing vehicle is sometimes swung through such an arc that it imposes a similar strain on the steering mechanism of the towed vehicle.

An object of this invention is to provide improved steering apparatus for a towable vehicle in which the steering apparatus is operable to impart steering movements to the steerable wheels of the towable vehicle and also is capable of movements beyond the normal steering range of the steerable wheels without subjecting the steering mechanism to any appreciable strain.

Another object of the invention is to provide steering apparatus of the kind referred to wherein positive control over the steerable wheels may be asserted regardless of the position of the steering mechanism.

A further object of the invention is to provide relatively simple and economical steering control apparatus of highly reliable character in which the steering mechanism of the towable vehicle is controlled by a swingable drawbar which is capable of movement with, and relative to, the steering mechanism so as to enable movement of the drawbar beyond the range of steering movement of the steering mechanism and without imposing any appreciable strain on the latter.

Other objects and advantages of the invention will be pointed out specifically or will become apparent from the following description when it is considered in conjunction with the appended claims and the accompanying drawings, in which:

Figure 1:
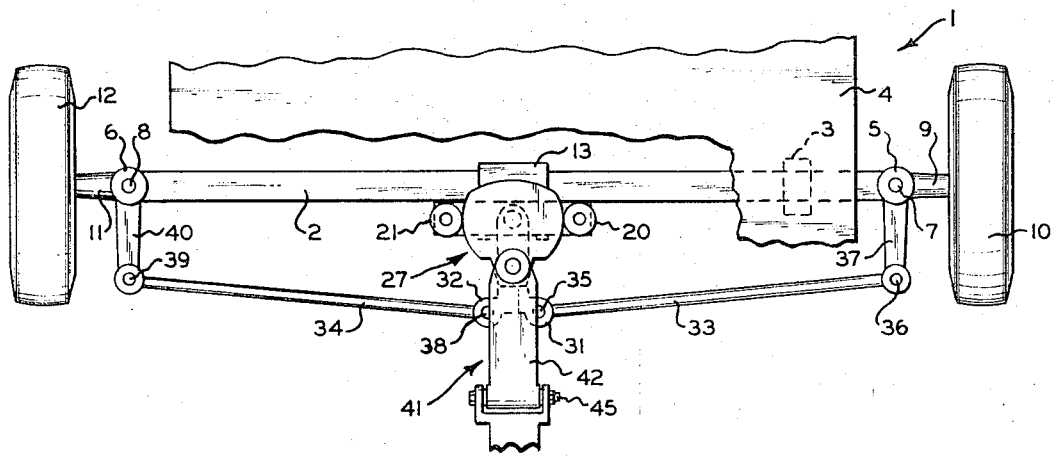
FIGURE 1 is a fragmentary, top plan view of a towable vehicle equipped with steerable wheels and with steering apparatus constructed in accordance with the invention, and illustrating the steering apparatus conditioned for straight-line travel of the vehicle.

Apparatus constructed in accordance with the invention is adapted for use in conjunction with a towable vehicle 1 having a front axle or support 2 on which may be mounted a plurality of shackling devices, one of which is indicated at 3 in FIGURE 1, and to which may be secured a load-carrying bed or platform 4. At opposite ends of the support 2 are steering knuckles 5 and 6 which are swivelably on the member 2 by kingpins 7 and 8, respectively. The steering knuckle 5 includes a spindle or shaft 9 on which is journaled a steerable wheel 10. A similar spindle or shaft 11 is secured to the steering knuckle 6 and journals a similar wheel 12.

Welded or otherwise suitably secured to the support 2 between the ends of the latter is a generally U-shaped frame 13 having parallel, upper and lower arms 14 and 15, the free ends of which project beyond the member 2, and the opposite ends of which are joined by a web 16. Welded or otherwise suitably fixed to the upper surface of the arm 14 is a mounting strap or bar 17 which extends beyond the member 13 substantially parallel to the support member 2.

Adjacent the ends of the member 17 are fixed upstanding stub shafts 18 and 19 on which are mounted stop members or rollers 20 and 21, respectively. The roller 20 is prevented from inadvertent separation from the shaft 18 by means of a washer 22 that is secured to the shaft 18 by means of a pin 23. A similar washer 24 and pin 25 prevent inadvertent separation of the roller 21 from the shaft 19.

Steering means designated generally by the reference character 27 is provided to initiate turning movements of the steerable wheels 10 and 12. The steering means comprises a link 28 having a hub 29 at one end which is received between the frame arms 14 and 15 and which is pivoted to the frame midway between the stop members 20 and 21 by means of a pivot pin 30. The axis of the pin 30 lies on a straight line L passing through the axes of the rollers 20 and 21. At its opposite end, the link 28 is provided with a pair of laterally projecting mounting ears 31 and 32. The arrangement is such that the link 28 is capable of swinging movements about the axis of the pivot pin 30 in either of two opposite directions from a neutral position shown in FIGURES 1, 4 and 5.

Means is provided for transmitting swinging movements of the link 28 to each of the steerable wheels and comprises a pair of tie rods 33 and 34. One end of the tie rod 33 is pivoted to the ear 31 by a pin 35, and the opposite end is pivoted by means of a pin 36 to a steering arm 37 which is fixed to the steering knuckle 5. The tie rod 34 is pivoted at one end by a pin 38 to the ear 32 and at its other end is pivoted by a pin 39 to a steering arm 40 which is fixed to the steering knuckle 6. The arrangement is such that rocking movements of the steering member 27 about the axis of the pivot pin 30 is imparted to the wheels 10 and 12 so as to effect steering movements of the latter.

Control means designated generally by the reference character 41 is provided to control the movements of the steering means 27. The control means 41 comprises an elongated lever 42 terminating at one end in an eye 43 that is adapted to be pivotally connected to a drawbar 44 or the like by means of a pin 45. The opposite end of the lever 42 terminates in a flat plate 46 that is adapted to be accommodated between the stop rollers 20 and 21. Between the ends of the lever 42 is a hub 47 in which is accommodated a rock shaft 48. The shaft 48 is fixed with respect to the hub 47 by a pin 49.

Between its ends the steering link 28 has fixed thereto upwardly and downwardly projecting sleeves 50 and 51, respectively, within which the shaft 48 is journaled by means of bearings 52. An arm 53 projects rearwardly from the sleeve 51 and terminates in an eye 54 in which the lower end of the pivot pin 30 is journaled. The construction and arrangement of the control means 41 are such that the lever 42 is rockable not only about the axis of the shaft 48, but also is rockable about the axis of the pin 30 in a manner and for a purpose presently to be explained.

Figure 4:
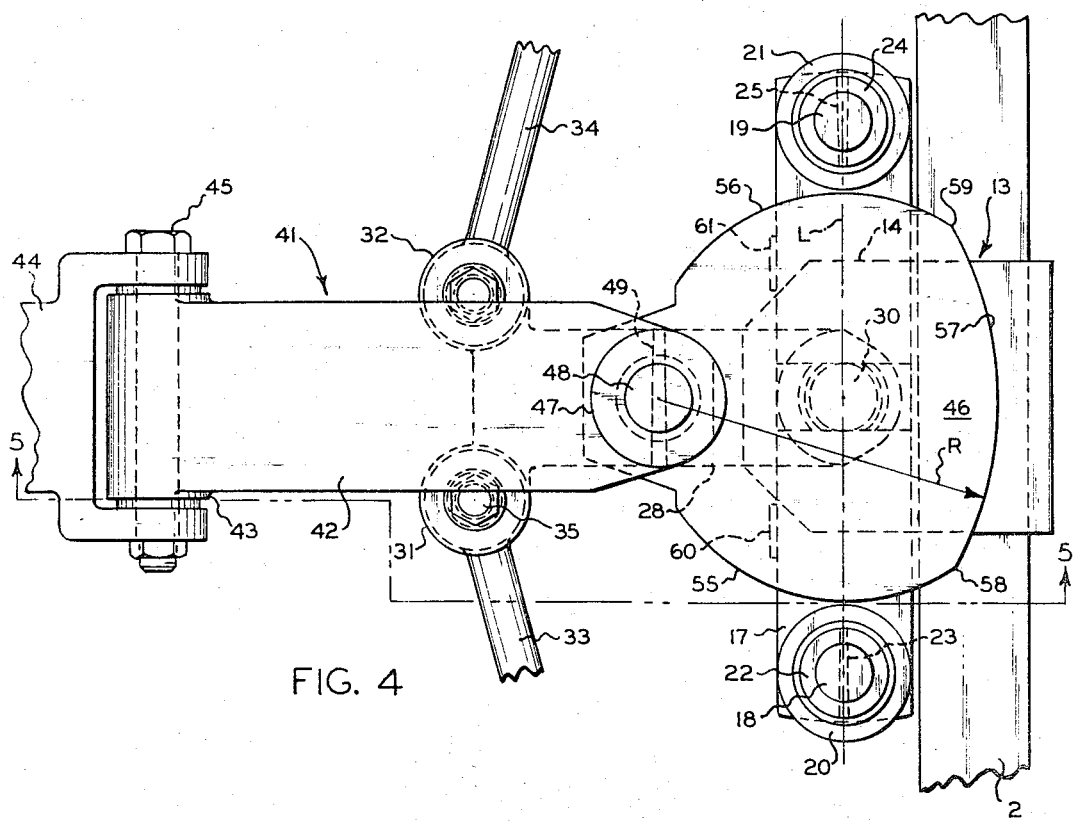
FIGURE 4 is an enlarged, fragmentary, top plan view of the steering control apparatus.
Figure 5:
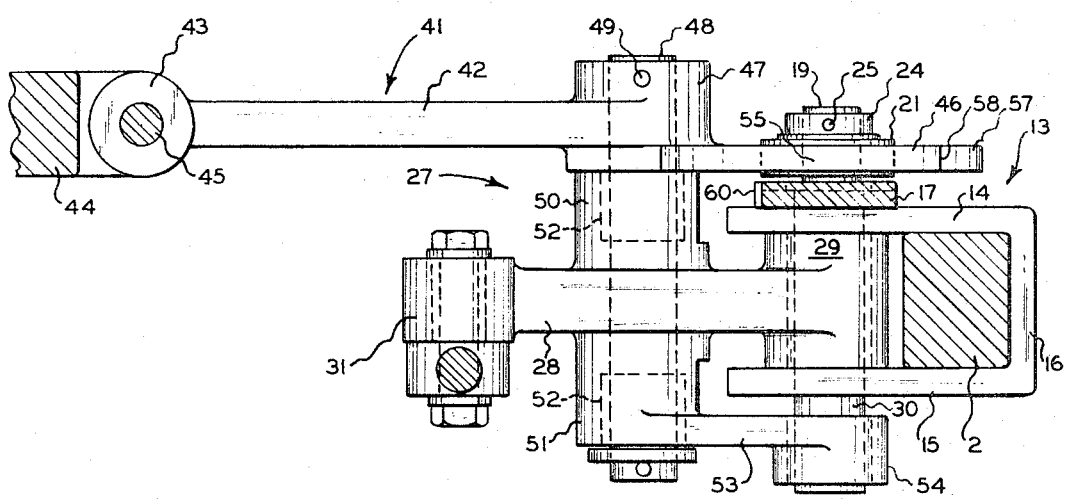
FIGURE 5 is a transverse sectional view taken on the line 5—5 of FIGURE 4.

As is best shown in FIGURE 4, the plate 46 of the control means 41 has a pair of arcuate side edges 55 and 56, each of which is formed on a radius corresponding substantially to the distance from the axis of the pin 30 to the peripheries of the rollers 20 and 21. The plate 46 has a rear arcuate edge 57 which preferably is formed on the radius R of a circle having its center located at the axis of the shaft 48. The juncture of the arcuate surface 57 with the arcuate surface 55 is indicated at 58, and the juncture of the surfaces 56 and 57 is indicated at 59.

When the apparatus is conditioned for straight-line travel, the steering means 27 and the control means 41 will be in their neutral positions indicated in FIGURES 1 and 4. In these positions of the parts, the tie rods 33 and 34 maintain the wheels 10 and 12 in such positions as to assure straight-line movement of the vehicle 1. When it is desired to turn the vehicle to the right, for example, a force may be applied to the control member 41 to move it in a clockwise direction, as viewed in FIGURES 1 and 4. Such force may be applied by the drawbar 44 or, if no drawbar is used, such force may be applied by hand directly to the lever 42.

Figure 2:
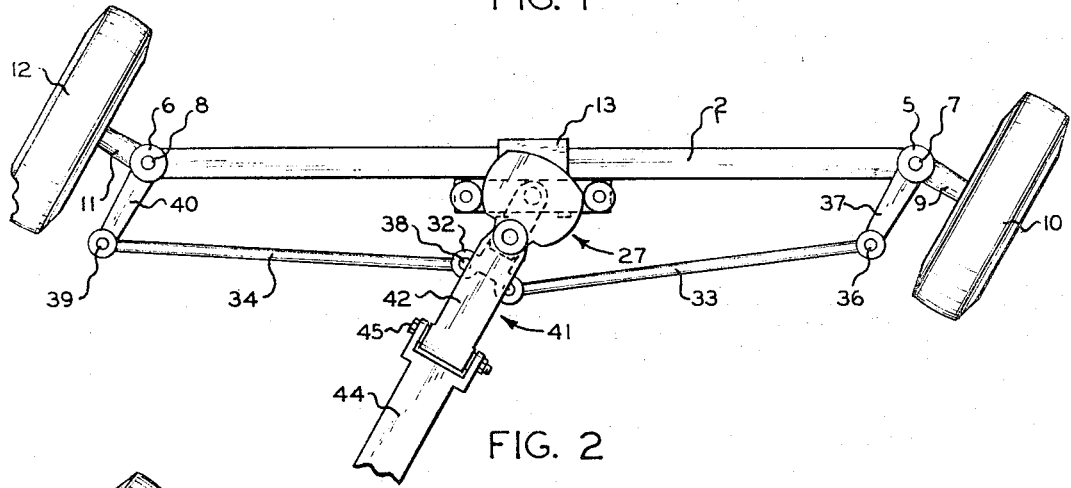
FIGURE 2 is a view similar to FIGURE 1, but illustrating the steering apparatus in condition to effect turning of the vehicle.

Upon the application of a force on the control means 41 to move it in a clockwise direction, the lever 42 tends to pivot about the axis of the shaft 48, but engagement of the plate 46 with the roller 20 precludes such pivoting of the lever 42. Consequently, the force applied on the lever 42 is transmitted via the shaft 48 to the steering link 28 so as to cause it, together with the control means 41, to rock in a clockwise direction about the axis of the pin 30. Controlled rocking of the lever 42 is permissible because of the arcuate surfaces 55 and 56 of the plate 46. Clockwise movement of the steering means 27 is transmitted via the tie rods 33 and 34 and the steering arms 37 and 40 to the respective wheels 10 and 12 so as to cause them to pivot in a clockwise direction as is indicated in FIGURE 2. By the same token, rocking movement of the steering means 27 counterclockwise from the position shown in FIGURE 1 will cause counterclockwise swiveling of the wheels 10 and 12.

Means is provided for limiting swinging movement of the steering means 27 in either direction from its neutral position. The limiting means comprises the member 17 and the sleeve 50 which are so oriented that the sleeve 50 may engage the member 17 when the link 28 has been swung a predetermined distance angularly in either direction from its neutral position. Preferably, wear plates 60 and 61 are welded or otherwise suitably fixed to the member 17 in such positions as to engage the sleeve 50. The arrangement of the limiting means and the length of the radius R are such that, when the link 28 has been swung to such position that the sleeve 50 engages one or the other of the wear plates 60 or 61, the plate 46 will be in such position that the appropriate juncture 58 or 59 will lie on the straight line L passing through the axes of the shafts 18 and 19 and the pivot pin 30. In this position of the sleeve 50 no further movement of the link 28 in a direction away from its neutral position is possible. The continued application of force to the control lever 42 pivots the lever 42 about the axis of the shaft 48 and rocks it relatively to the link 28. Such relative movement between the lever 42 and the link 28 is enabled because the arcuate surface 57 on the plate 46 then is in a position to move past the appropriate roller 20 or 21. These positions of the parts are illustrated in FIGURE 3.

Figure 3:
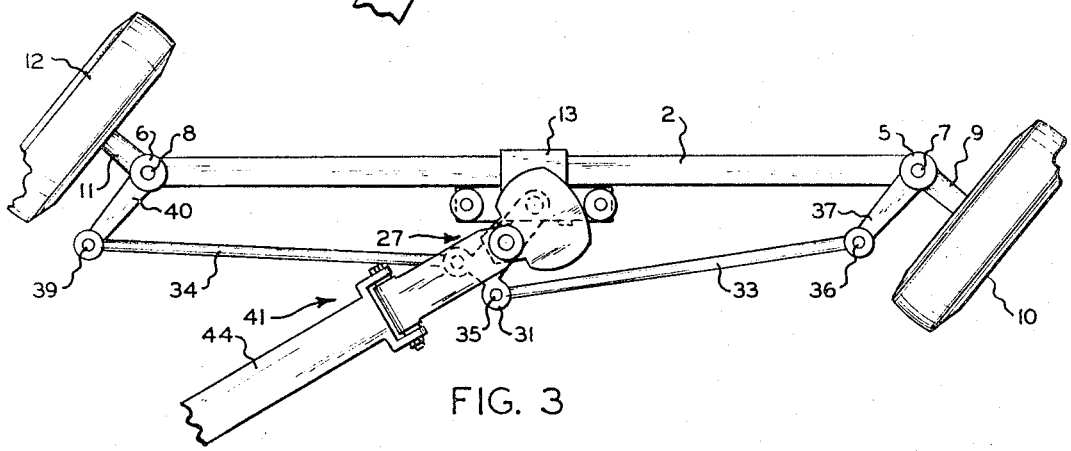
FIGURE 3 is a view similar to FIGURE 2, but illustrating the steerable wheels in one position of maximum steering adjustment and illustrating the steering control mechanism in a position beyond that corresponding to the maximum turning position of the wheels.

As will be apparent from FIGURE 3, the sleeve 50 is in engagement with the wear plate 61 and thus is in its extreme position of clockwise adjustment. The lever 42, however, has been rocked clockwise relatively to the steering link 28 from the position shown in FIGURE 2. Thus, the control means 41 is capable of being swung past the extreme position of the steering link 28 and without imposing any stress on the steering mechanism.

When the parts are in a position shown in FIGURE 3, the sleeve 50 is in snug engagement with the wear plate 61 and the arcuate surface 57 of the plate 56 is in snug engagement with the periphery of the stop roller 20. Thus, the steering link 28 cannot be swung either clockwise or counterclockwise and, accordingly, the wheels 10 and 12 are firmly held in their adjusted positions.

To return the vehicle wheels to a straight-line position from the position shown in FIGURE 3, the control lever 42 may be rocked counterclockwise about the axis of the shaft 48 until such time as the nodule 58 moves rearwardly slightly past the line L. In this position of the plate 46, both of the surfaces 55 and 56 will be in engagement with their respective stop rollers 20 and 21, thereby disabling relative movement between the control lever 42 and the steering link 28. Thus, further counterclockwise movement of the lever 42 will effect conjoint movement of the latter and the link 28 about the axis of the pin 30 so as to rock the wheels 10 and 12 in a counterclockwise direction.

The disclosed embodiment is representative of a presently preferred form of the invention, but is intended to be illustrative rather than definitive thereof. The invention is defined in the claims.

What is claimed is:

1. Vehicle steering apparatus comprising: support means; steerable wheel journaling means mounted on said support means; steering means mounted on said support means for rocking movements about a first axis; means for limiting rocking movements of said steering means; motion transmitting means interconnecting said steering means and said journaling means for imparting steering movements to the latter in response to rocking of said steering means; control means mounted on said steering means for rocking movements relative to the latter about an axis spaced from said first axis; and abutment means mounted by the support means on opposite sides of said control means for disabling relative rocking movement of said steering means and said control means during rocking of said steering means and enabling rocking of said control means relatively to said steering means when rocking of the latter is prevented by said limiting means.

2. Vehicle steering apparatus comprising support means; steerable wheel journaling means mounted on said support means for rocking movements in either of two directions about a first axis from a neutral position; means for limiting movement of said steering means in either of said directions from said neutral position; motion transmitting means interconnecting said steering means and said journaling means for imparting steering movements to the latter in response to rocking of said steering means; control means mounted on said steering means for rocking movements relative to the latter about an axis spaced from said first axis; and means on opposite sides of said control means reacting between said support means and said control means for disabling relative rocking movement of said control means and said steering means until the latter has been rocked from said neutral position the maximum distance permitted by said limiting means and thereafter enabling rocking movement of said control means relative to said steering means about said second axis.

3. Vehicle steering apparatus comprising support means; steerable wheel journaling means mounted on said support means; a pair of spaced apart stop members mounted on said support means; steering means pivotally mounted on said support means for rocking movement in either of two directions from a neutral position about a first axis located midway between said stop members; motion transmitting means interconnecting said steering means and said journaling means for imparting steering movements to the latter in response to rocking movements of said steering means; control means pivotally mounted on said steering means for rocking movements relative thereto about a second axis spaced from said first axis, said control means including a part interposed between and engaging both of said stop members when said steering means is in said neutral position for disabling relative rocking movement of said steering means and said control means; and means engageable with said steering means for limiting rocking movement thereof in either one of said two directions from said neutral position, said part and stop members being so constructed and arranged as to enable rocking movement of said control means in said one direction about said second axis and relative to said steering means following engagement of the latter with said limiting means.

4. Vehicle steering apparatus comprising support means; steerable wheel journaling means mounted on said support means; a pair of spaced apart stop members mounted on said support means; steering means pivotally mounted on said support means for rocking movement in either of two directions from a neutral position about a first axis located midway between said stop members; motion transmitting means interconnecting said steering means and said journaling means for imparting steering movements to the latter in response to rocking movements of said steering means; control means pivotally mounted on said steering means for rocking movements relative thereto about a second axis spaced from said first axis, said control means including a part interposed between and engaging both of said stop members when said steering means is in said neutral position for disabling relative rocking movement of said steering means and said control means; and means engageable with said steering means for limiting rocking movement thereof in either one of said two directions from said neutral position, said part and said stop members being so constructed and arranged as to enable rocking movement of said control means in said one direction about said second axis and relative to said steering means following engagement of the latter with said limiting means, said stop means and said part acting on said steering means following said relative movement of said control means and said steering means for preventing rocking movement of the latter toward said neutral position.

5. The apparatus set forth in claim 4 wherein said part has opposite sides one adjacent each of said stop members, and wherein each of said sides is formed on an arc having a radius corresponding substantially to the distance from said first axis to said stop members.

6. The apparatus set forth in claim 5 wherein said part has a surface extending between said sides and formed on the arc of a circle having its center located at said second axis.

7. The apparatus set forth in claim 4 wherein each of said stop members is mounted for rotation about its own axis.

8. Vehicle steering apparatus comprising support means; steerable wheel journaling means mounted on said support means; a pair of spaced apart stop members mounted on said support means; a steering member pivoted on said support means for rocking movements in either of two opposite directions about a first axis midway between said stop members from a neutral position to either of two extreme positions; means interconnecting said steering member and said journaling means for imparting steering movements to the latter in response to rocking movements of said steering member; a control member having a forward end and a rearward end; means pivoting said control member intermediate its ends on said steering member for rocking movements about a second axis spaced forwardly from said first axis and with said rearward end of said control member interposed between and engaging said stop members for preventing relative rocking movements between said control member and said steering member when the latter is in any position other than said extreme positions, said rearward end of said control member being movable relatively to said stop members in response to movement of said steering member about said first axis to either of said extreme positions to such position as to be capable of movement relative to said steering member about said second axis; and means adjacent the forward end of said control member for connecting the latter to a towing device.

9. The apparatus set forth in claim 8 wherein said first axis is located on a straight line passing through both of said stop members.

10. The apparatus set forth in claim 9 wherein said rearward end of said control member has opposite, arcuate side surfaces formed on an arc corresponding to the distance between said first axis and one of said stop members.

11. The apparatus set forth in claim 10 wherein said rearward end of said control member terminates in an arcuate surface formed on the arc of a circle having its center at said second axis.

12. The apparatus set forth in claim 11 wherein the radius of said rearward arcuate surface is greater than the radius of said side surfaces.

13. The apparatus set forth in claim 12 wherein the radius of said rearward surface is of such length that one of the junctures of said side surfaces with said rearward surface lies on said straight line when said steering member is in either of its extreme positions.

References Cited by the Examiner

UNITED STATES PATENTS 3,108,821 10/1963 Krauss _____ 280—103
3,195,915 7/1965 Moore _____ 280—103

FOREIGN PATENTS 813,344 9/1951 Germany.

KENNETH H. BETTS, *Primary Examiner.*